US006992254B2

(12) United States Patent
Komiya

(10) Patent No.: US 6,992,254 B2
(45) Date of Patent: Jan. 31, 2006

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/095,267

(22) Filed: Mar. 31, 2005

(65) Prior Publication Data

US 2005/0269126 A1 Dec. 8, 2005

(30) Foreign Application Priority Data

Jun. 7, 2004 (JP) ............................. 2004-168625

(51) Int. Cl.
*F16G 13/16* (2006.01)
(52) U.S. Cl. .................. 174/138 B; 59/78.1; 248/49; 248/51
(58) Field of Classification Search ........... 174/138 B; 59/78.1; 248/49, 51
See application file for complete search history.

(56) References Cited

U.S. PATENT DOCUMENTS

| 4,800,714 | A | * | 1/1989 | Moritz | 59/78.1 |
| 5,048,283 | A | * | 9/1991 | Moritz et al. | 59/78.1 |
| RE35,579 | E | * | 8/1997 | Moritz et al. | 59/78.1 |
| 5,987,873 | A | | 11/1999 | Blase | |
| 6,349,534 | B1 | * | 2/2002 | Zanolla et al. | 59/78.1 |

FOREIGN PATENT DOCUMENTS

| JP | 2511211 | 6/1993 |
| JP | P3110766 | 9/2000 |

* cited by examiner

*Primary Examiner*—Jinhee Lee
(74) *Attorney, Agent, or Firm*—Woodling, Krost and Rust

(57) ABSTRACT

A cable or the like protection and guide device which can suppress collision noise generated when adjacent link plates repeat a linear mode and a flexion mode to attain low noise, and can exhibit excellent wear resistance is provided. In a cable or the like protection and guide device (100), a C-shaped flexion guide groove (116) concentric with a connecting pin hole (115) is provided on a plate side (111) and V-shaped stopper surfaces (116a) are formed on end portions of the C-shaped flexion guide groove (116). Further, a flexion guiding protrusion (117), which engages the C-shaped flexion guide groove (116), is provided on another link plate (111) connected to a connecting pin hole (115) side of the link plate (111) so that an arc-shaped contact surface (117a) is formed on a protrusion outer circumferential portion of the flexion guiding protrusion (117). Thus, the arc-shaped contact surface (117a) of the flexion guiding protrusion (117) makes point contact with the V-shaped stopper surface (116) of the C-shaped flexion guide groove (116) so that flexible movement of adjacent link plates (111), (111) are restricted.

5 Claims, 5 Drawing Sheets

CABLE OR THE LIKE PROTECTION AND GUIDE DEVICE

This application claims priority to Japanese Pat. Appln. 2004-168625 filed Jun. 7, 2004.

TECHNICAL FIELD

The present invention relates to a cable or the like protection and guide device for securely and reliably protecting and guiding a flexible cable or the like, such as an electrical cable, a hydraulic hose, a pneumatic hose, an optical fiber cable or the like, used in industry machines such as a machine tool, an electric device, an industrial robot, a transportation machine and the like, and in which electricity feeding, fluid feeding and signaling and the like are performed to the moving machines or movable portions of the machines.

BACKGROUND TECHNOLOGY

Such kinds of cable or the like protection and guide devices usually include a cable drag chain, which accommodates cables, hoses or the like therein, and in which a plurality of link bodies each of which is formed by connecting the center portions of a pair of spaced and opposed link plates with connecting plates or rods are pivotably connected to each other with shafts and holes formed in overlapped portions of said link plates (see Patent Reference 1 for example).

Further, the above-mentioned cable or the like protection and guide devices include an energy guide chain, which guides a hose with a plurality of chain elements comprised of a side member and a crossbar, which are connected to each other between two connecting points at least one of which can be position-changed, and in which a relative pivotability between adjacent chains is restricted by a corresponding stopper portion disposed in a chain element having a contact surface (see Patent Reference 2 for example).

Patent Reference 1 is the Specification of Japanese Patent No. 2511211 (page 1, FIG. 1).

Patent Reference 2 is the Specification of Japanese Patent No. 3110766 (page 1, FIG. 1).

Problems to be Solved by the Invention

However, these cable drag chain or energy guide chain is liable to generate a warpage or a sink mark on a stopper's contact surface during molding. When such a warpage or a sink mark is generated, there is a problem that connected link plates make local surface contact with each other during the repeating of a linear mode and a flexion mode of the connected link plates so that limiting angle between their link plates becomes difficult to control. Further, when connected link plates are controlled to be a linear mode and a flexion mode in a uniform surface contact state, there is an antinomic problem that collision noise due to the surface contact is liable to occur and the rigidity of the stopper must be enhanced.

Accordingly, the objects of the present invention are to solve the above-mentioned problems and to provide a cable or the like protection and guide device, which can suppress collision noise generated when adjacent link plates repeat a linear mode and a flexion mode to attain low noise, and can exhibit excellent wear resistance.

Means for Solving the Problems

To attain the above-mentioned objects, a cable or the like protection and guide device of this invention according to claim 1 in which a large number of rectangular link frame bodies each comprising a pair of spaced right and left link plates, and connecting plates bridged over a flexion inner circumferential side and a flexion outer circumferential side of the pair of link plates respectively are flexibly connected to each other by connecting pins and connecting pin holes formed in said link plates and a cable is inserted into a cable accommodating space formed of the continuously formed link frame bodies to guide and protect said cable, is characterized in that a C-shaped flexion guide groove concentric with said connecting pin hole is provided on a plate side surface of said link plate and tapered V-shaped stopper surfaces are formed on end portions of said C-shaped flexion guide groove, a flexion guiding protrusion, which engages said C-shaped flexion guide groove, is provided on a plate side surface of another link plate connected to a connecting pin hole side of said link plate so that an arc-shaped contact surface is formed on a protrusion outer circumferential portion of the flexion guiding protrusion, and that said arc-shaped contact surface of said flexion guiding protrusion makes point contact with the V-shaped stopper surface of the C-shaped flexion guide groove so that flexible movement of adjacent link plates are restricted.

And in addition to the configuration of the invention according to claim 1, the invention according to claim 2 is characterized in that a plurality of V-shaped stopper surfaces are formed and a plurality of guide protrusions, which respectively engage said V-shaped stopper surfaces, are formed in a state where the end portions of said C-shaped flexion guide groove are branched to inner and outer circumferential sides.

Further, in addition to the configuration of the invention according to claim 1, the invention according to claim 3 is characterized in that a soft roller member is fitted onto said flexion guiding protrusion.

Further, in addition to the configuration of the invention according to claim 1, the invention according to claim 4 is characterized in that it includes a braking area in which the groove width of said C-shaped flexion guide groove is narrowed toward the end portion. And, in addition to the configuration of the invention according to claim 3, the invention according to claim 5 is characterized in that it includes a braking area in which the groove width of said C-shaped flexion guide groove is narrowed toward the end portion.

EFFECTS OF THE INVENTION

Thus, according to the cable or the like protection and guide device of the present invention, since a large number of rectangular link frame bodies each comprising a pair of spaced right and left link plates, and connecting plates bridged over a flexion inner circumferential side and a flexion outer circumferential side of the pair of link plates respectively are flexibly connected to each other by connecting pins and connecting pin holes formed in said link plates, a cable is not only protected or guided by inserting a cable or the like in a cable accommodating space formed of connected link frame bodies, but also the following peculiar effects are obtained.

Namely, in the cable or the like protection and guide device, which is the invention of claim 1, since a C-shaped flexion guide groove concentric with the connecting pin hole is provided on a plate side surface of the link plate and tapered V-shaped stopper surfaces are formed on end portions of said C-shaped flexion guide groove, and a flexion guiding protrusion, which engages the C-shaped flexion guide groove, is provided on a plate side surface of another link plate connected to a connecting pin hole side of said link plate so that an arc-shaped contact surface is formed on a protrusion outer circumferential portion of the flexion guiding protrusion, the arc-shaped contact surface of the flexion guiding protrusion makes point contact with the V-shaped stopper surface of the C-shaped flexion guide groove when adjacent link plates repeat a linear mode and a flexion mode, an explosive sound of air sealed between the V-shaped stopper surface, that is a collision noise is suppressed so that low noise can be attained, and an instantaneous overload due to such collision noise is avoided whereby excellent wear resistance can be exhibited. Further, even though warpage or a shrink mark is generated during molding, a shift is not generated in a limiting angle due to flexible movement of adjacent or connected link plates. Thus the cable or the like protection and guide device of claim 1 can be manufactured at high accuracy and low cost.

And in the cable or the like protection and guide device, which is the invention of claim 2, since a plurality of V-shaped stopper surfaces are formed and a plurality of guide protrusions, which respectively engage said V-shaped stopper surfaces, are formed in a state where the end portions of said C-shaped flexion guide groove are branched to inner and outer circumferential sides, a load generated when the V-shaped stopper surface of the C-shaped flexion guide groove and the arc-shaped contact surface make point contact with each other is dispersed at a plurality of positions to reduce it in addition to the effect of the invention according to claim 1. Thus, collision noise is further suppressed whereby low noise can be attained and excellent wear resistance can be exhibited.

Further, in the cable or the like protection and guide device, which is the invention of claim 3, since a soft roller member is fitted onto said flexion guiding protrusion, the soft roller member absorbs a collision load to reduce it when the flexion guiding protrusion makes point contact with the V-shaped stopper surface of the C-shaped flexion guide groove, in addition to the effect of the invention according to claim 1. Thus, collision noise is further suppressed whereby low noise can be attained and excellent wear resistance can be exhibited Further, in the cable or the like protection and guide device, which is the invention of claim 4, since it includes a braking area in which the groove width of said C-shaped flexion guide groove is narrowed toward the end portion, the C-shaped flexion guide groove including such a narrowed groove width toward the end portion reduces the collision energy of the flexion guiding protrusion so that the flexion guiding protrusion is speed-reduced, in addition to the effect of claim 1. And, in the cable or the like protection and guide device, which is the invention of claim 5, since it includes a braking area in which the groove width of said C-shaped flexion guide groove is narrowed toward the end portion, the C-shaped flexion guide groove including such a narrowed groove width toward the end portion reduces the collision energy of the flexion guiding protrusion so that the flexion guiding protrusion is speed-reduced, in addition to the effect of claim 3. Thus, collision noise is further suppressed whereby low noise can be attained and excellent wear resistance can be exhibited.

A better understanding of the drawings will be had when reference is made to the Description of the Invention and claims which follow hereinbelow.

DESCRIPTION OF THE INVENTION

Cable or the like protection and guide devices which are examples of the present invention will be described with reference to drawings.

EXAMPLE 1

Figure 1:
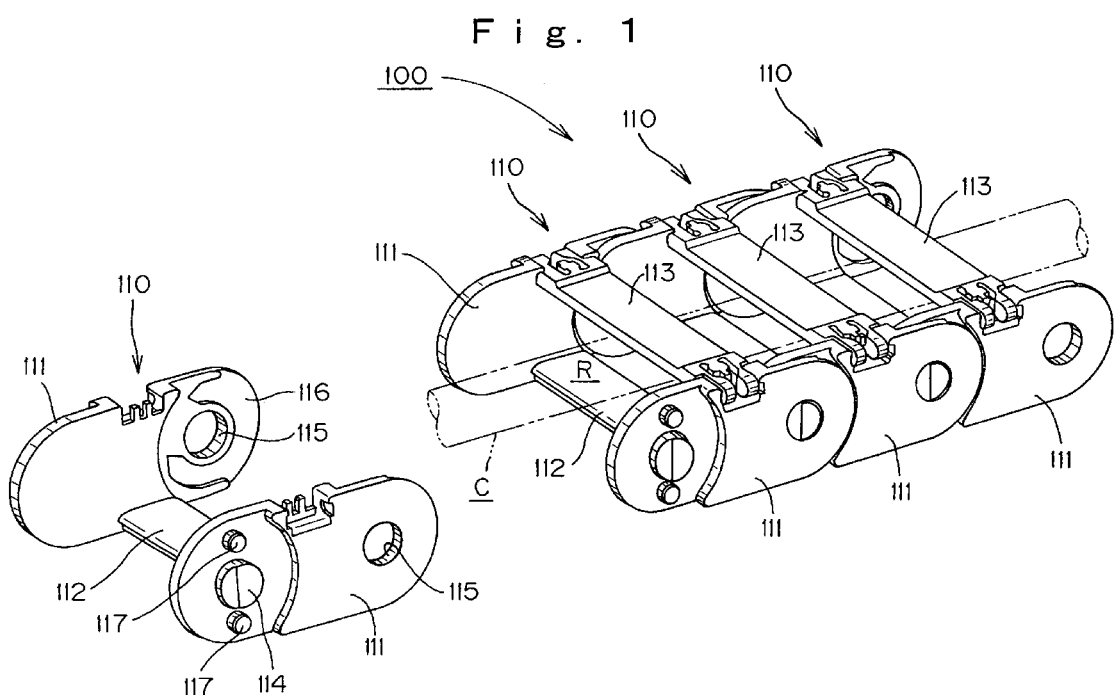
FIG. 1 is a perspective view of a cable protection and guide device according to example 1 of the present invention.
Figure 2:
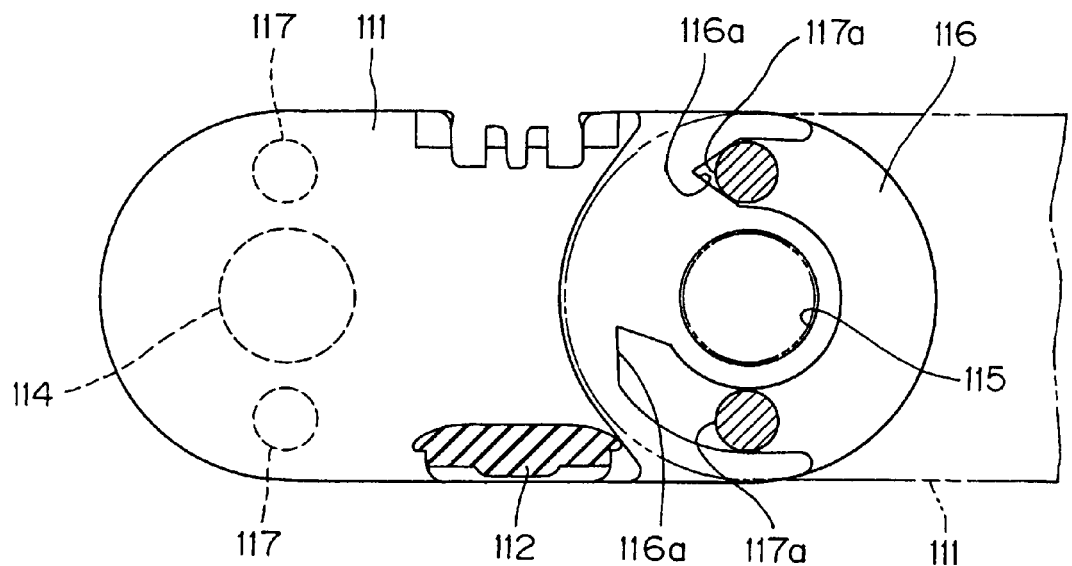
FIG. 2 is a cross-sectional view showing a linear mode of adjacent link plates in FIG. 1.
Figure 3:
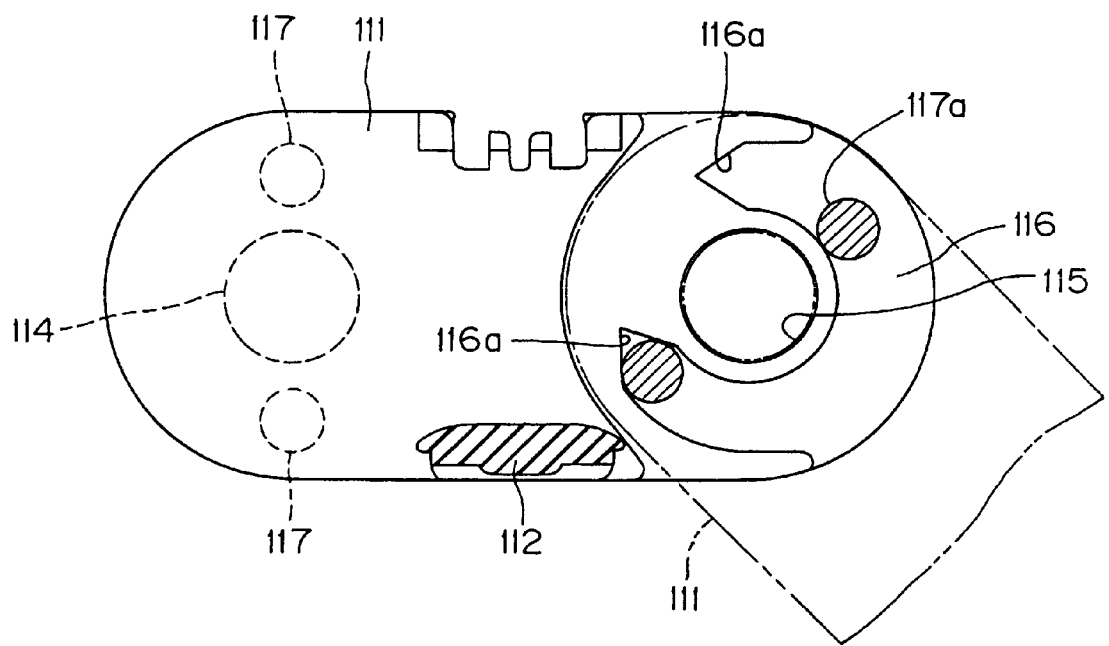
FIG. 3 is a cross-sectional view showing a flexion mode of adjacent link plates in FIG. 1.

First, FIG. 1 is a perspective view of a cable protection and guide device 100 according to example 1 of the present invention, FIG. 2 is a cross-sectional view showing a linear mode of adjacent link plates in FIG. 1, and FIG. 3 is a cross-sectional view showing a flexion mode of the adjacent link plates in FIG. 1.

The cable protection and guide device 100 according to example 1 of the present invention is used for protecting and guiding a cable or the like C such as an electric cable for transmission of electric signals or supplying electric power to connect a movable portion and a stationary portion (not shown) of a production device of a plasma display and a semiconductor device or a vehicle or the like, or a hose for supplying oil pressure or pneumatic pressure. And in the cable or the like protection and guide device of the present example, rectangular link frame bodies 110 are connected in large numbers in an elongated shape for connecting the above-mentioned movable portion and stationary portion, so that it can exhibit a linear mode or a flexion mode in accordance with movement conditions between the movable portion and the stationary portion. As a result a cable or the like C can be protected and guided while it is inserted into a cable accommodating space R formed of these continuous link frame bodies 110.

The above-mentioned link frame body 110 is molded of a glass fiber reinforced polyamide base resin, which can exhibit excellent strength properties. And in the link frame body 110, a pair of spaced right and left link plates 111, 111, a flexion inner circumferential connecting plate 112 bridged on the flexion inner circumferential side of the link plates 111, 111, and a flexion outer circumferential side connecting plate 113 bridged on the flexion outer circumferential side are integrally formed in a rectangular shape.

That is although the flexion inner circumferential connecting plate 112 is integrally injection-molded with the pair of right and left link plates 111, 111, one end of the flexion outer circumferential side connecting plate 113 is pivotably connected to one link plate 111 and the other end thereof can be opened or closed so that it can be engaged with the other link plate 111.

And the front and rear portions of the link plate 111 form a step in the plate thickness direction or exhibits an offset structure. Further, the rear portion of the link plate 111 is provided with a connecting pin 114 and the front portion of the link plate 111 is provided with a connecting pin hole 115 having substantially the same diameter as the connecting pin 114.

Therefore, the adjacent or continuous link frame bodies 110 are connected to each other by fitting the connecting pin 114 into the connecting pin hole 115 of the link plates 111, 111 continuously disposed so that the link frame bodies 110 can be flexed about the connecting pin 114.

Next, a C-shaped flexion guide groove 116 and a flexion guiding protrusions 117 formed on plate side surface of a link plate 111, which is the most characteristic in the cable protection and guide device 100 of example 1, will be described with reference to FIGS. 2 and 3.

The C-shaped flexion guide groove 116 is provided concentrically with the connecting pin hole 115 in the link plate 111, and at end portions of this C-shaped flexion guide groove 116 are formed tapered V-shaped stopper surfaces 116a, 116a.

Further, the flexion guiding protrusions 117, 117 include an angle of 180° through the center of the connecting pin hole 115, and the C-shaped flexion guide groove 116 has such an arc length that the flexion guiding protrusions 117, 117 of adjacent link frame bodies 110 can be positioned at the respective end portions when the flexion guiding protrusions 117, 117 are moved between a linear mode and a flexion mode.

It is noted that although the C-shaped flexion guide groove 116 in example 1 adopts a partially cut out groove form because of a simple assembly of adjacent frame bodies 110 and simple mold removing of the link plate 111, it may adopt such a groove form that the guide groove is completely closed.

On the other hand, the flexion guiding protrusions 117 are provided on another link plate 111 connected to a connecting pin hole 115 side of the link plate 111 and engages the above-mentioned C-shaped flexion guide groove 116, and on the outer circumferential portion of the flexion guiding protrusion 117 is formed an arc-shaped contact surface 117a.

And flexible movement of adjacent link plates 111, 111 is controlled by making point contact of the arc-shaped contact surface 117a of the flexion guiding protrusion 117 with the V-shaped stopper surface 116a of the C-shaped flexion guide groove 116.

In the thus obtained cable protection and guide device 100 of example 1, when the adjacent link plates 111, 111 repeat a linear mode and a flexion mode, the arc-shaped contact surface 117a of the flexion guiding protrusion 117 makes point contact with the V-shaped stopper surface 116a of the C-shaped flexion guide groove 116. Thus an explosive sound of air sealed between the V-shaped stopper surface, that is a collision noise is suppressed so that low noise can be attained, and an instantaneous overload due to such collision noise is avoided whereby excellent wear resistance can be exhibited. Further, even though warpage or a shrink mark is generated during molding, a shift is not generated in a limiting angle due to flexible movement of adjacent or connected link plates 111, 111. Thus the cable or the like protection and guide device can be manufactured at high accuracy and low cost.

EXAMPLE 2

Figure 4:
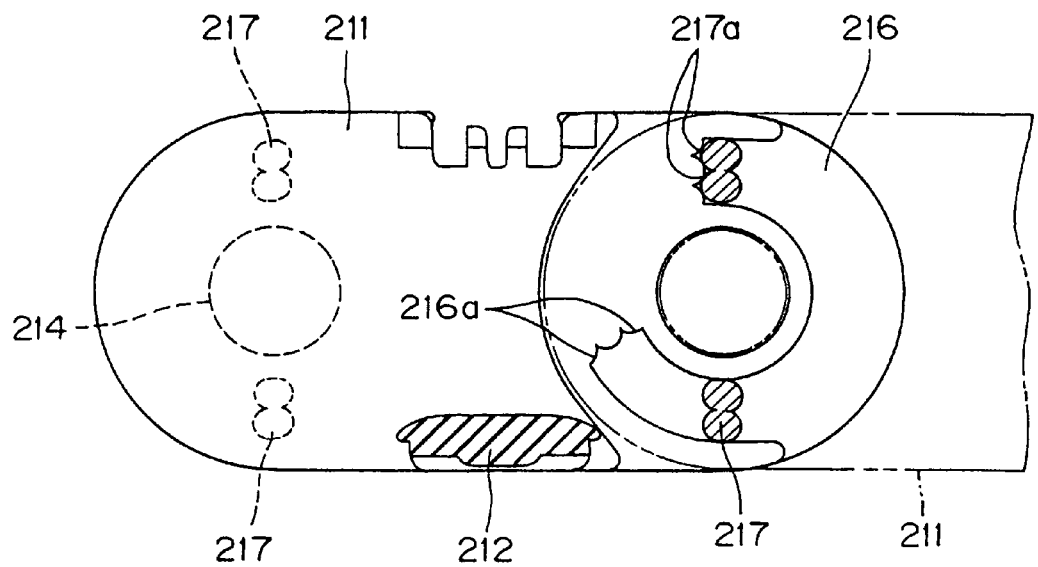
FIG. 4 is a cross-sectional view showing a linear mode of adjacent link plates in example 2 of the present invention.
Figure 5:
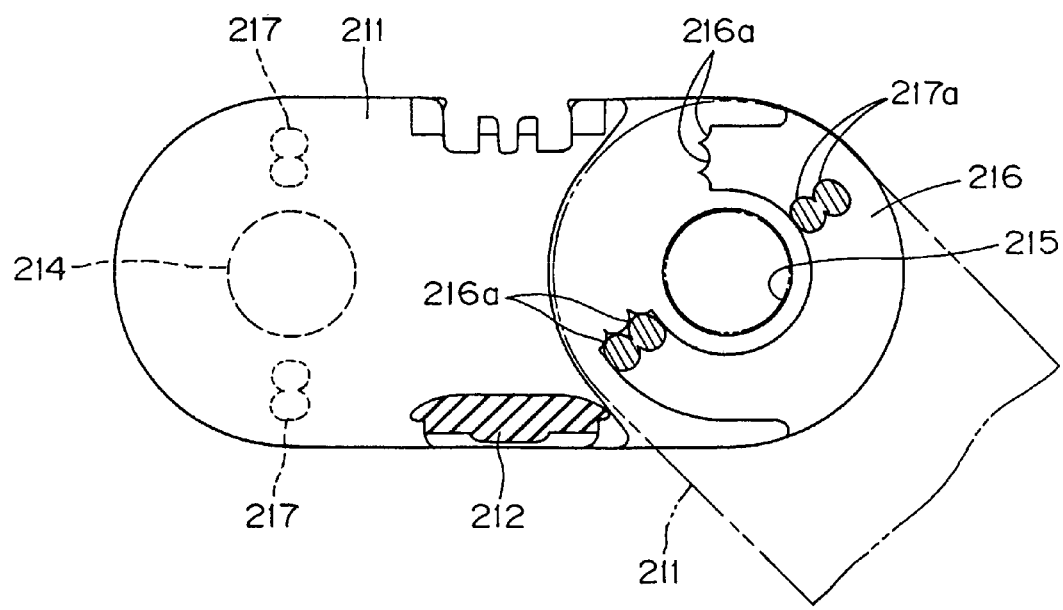
FIG. 5 is a cross-sectional view showing a flexion mode of adjacent link plates in example 2 of the present invention.

FIGS. 4 and 5 show a cable protection and guide device 200 according to example 2 of the present invention, and particularly, FIG. 4 is a cross-sectional view showing a linear mode of adjacent link plates in example 2 and FIG. 5 is a cross-sectional view showing a flexion mode of adjacent link plates in example 2.

As compared with the cable protection and guide device 100 in which the C-shaped flexion guide groove 116 and the flexion guiding protrusion 117 are formed on the link plates 111, a cable protection and guide device 200 according to example 2 is characterized in that two V-shaped stoppers 216a, 216a are formed with an end portion of the C-shaped flexion guide groove 116 divided into two parts on inner and outer circumferential sides of a C-shaped flexion guide groove 216, and two flexion guiding protrusions 217, 217, which respectively engage the V-shaped stoppers 216a, 216a are provided. And other device configurations of the cable or the like protection and guide device 200 according to example 2 are not different from those of the cable or the like protection and guide device 100 according to example 1.

Therefore, since in the cable protection and guide device 200, two V-shaped stoppers 216a, 216a are formed with an end portion of the C-shaped flexion guide groove 116 divided into two parts on inner and outer circumferential sides of a C-shaped flexion guide groove 216, and two flexion guiding protrusions 217, 217, which respectively engage the V-shaped stoppers 216a, 216a, are provided, a load generated when the V-shaped stopper surface of the C-shaped flexion guide groove and the arc-shaped contact surface make point contact with each other is dispersed at two positions to be able to reduce it to half as shown in FIGS. 4 and 5 in addition to the effect of the above-mentioned the cable or the like protection and guide device 100. Thus, collision noise is further suppressed whereby low noise can be attained and excellent wear resistance can be exhibited. Thus the effects of the cable or the like protection and guide device 200 are very large.

EXAMPLE 3

Figure 6:
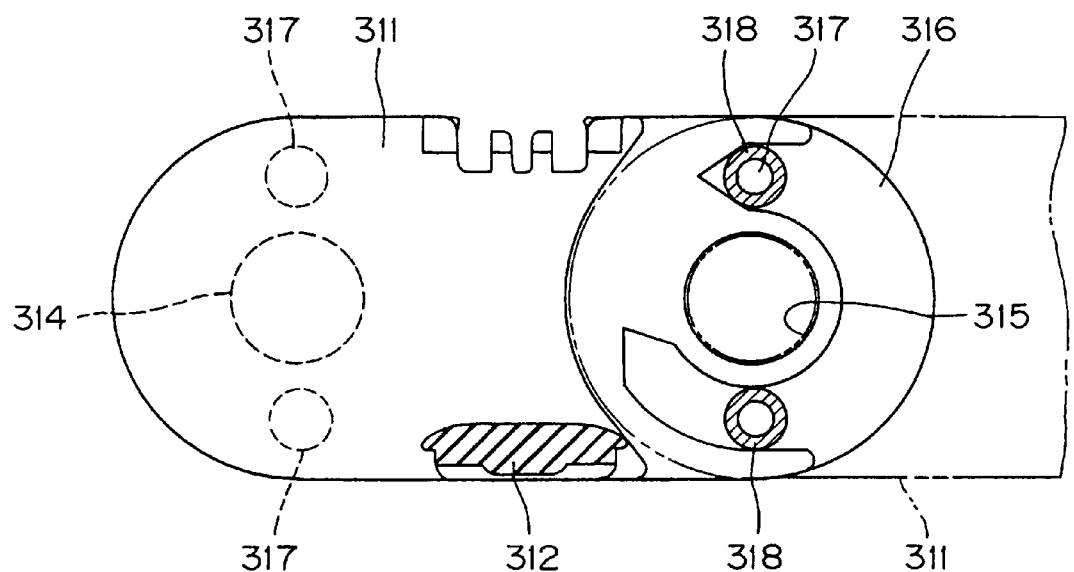
FIG. 6 is a cross-sectional view showing a linear mode of adjacent link plates in example 3 of the present invention.
Figure 7:
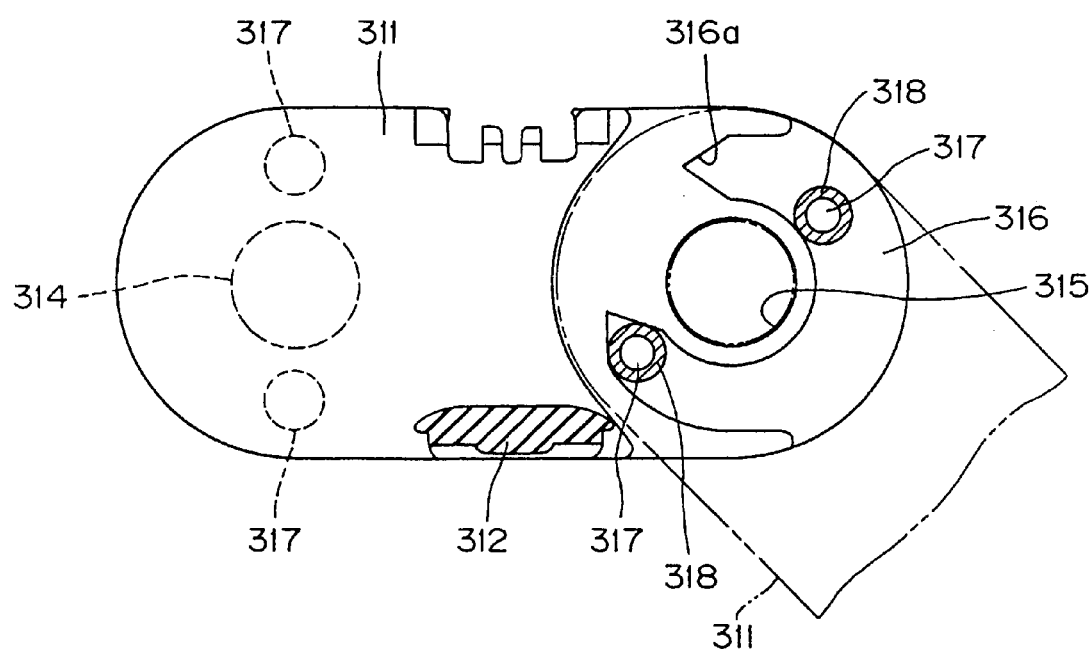
FIG. 7 is a cross-sectional view showing a flexion mode of adjacent link plates in example 3 of the present invention.

FIGS. 6 and 7 show a cable protection and guide device 300 according to example 3 of the present invention, and particularly, FIG. 6 is a cross-sectional view showing a linear mode of adjacent link plates in example 3 and FIG. 7 is a cross-sectional view showing a flexion mode of adjacent link plates in example 3. As compared with the cable protection and guide device 100 in which the C-shaped flexion guide groove 116 and the flexion guiding protrusion 117 are formed on the link plates 111, a cable protection and guide device 300 according to example 3 is characterized in that a soft roller member 318 is fitted on a flexion guiding protrusion 117. And other device configurations of the cable or the like protection and guide device 300 according to example 3 are not different from those of the cable or the like protection and guide device 100 according to example 1.

Therefore, since in the cable protection and guide device 300 of example 3, the soft roller member 318 is fitted on the flexion guiding protrusion 317, when the flexion guiding protrusion 317 makes point contact with the V-shaped stopper surface 316a of the C-shaped flexion guide groove 316 as shown in FIGS. 6 and 7, the soft roller member 318 absorbs a collision load to reduce it, in addition to the effect of the invention according to claim 1. Thus, collision noise is further suppressed whereby low noise can be attained and excellent wear resistance can be exhibited. Thus the effects of the cable or the like protection and guide device 300 are very large.

EXAMPLE 4

Figure 8:
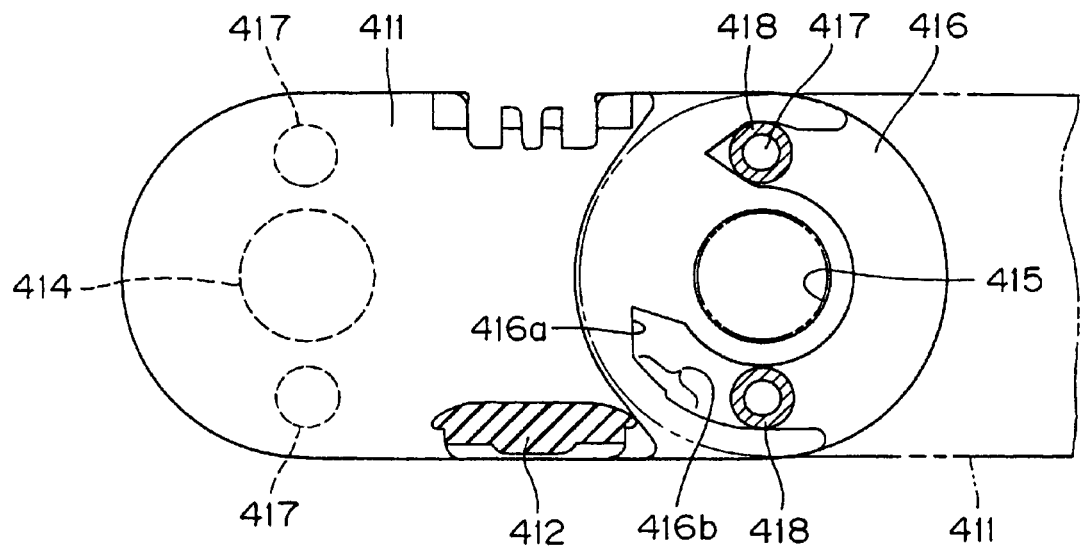
FIG. 8 is a cross-sectional view showing a linear mode of adjacent link plates in example 4 of the present invention.
Figure 9:
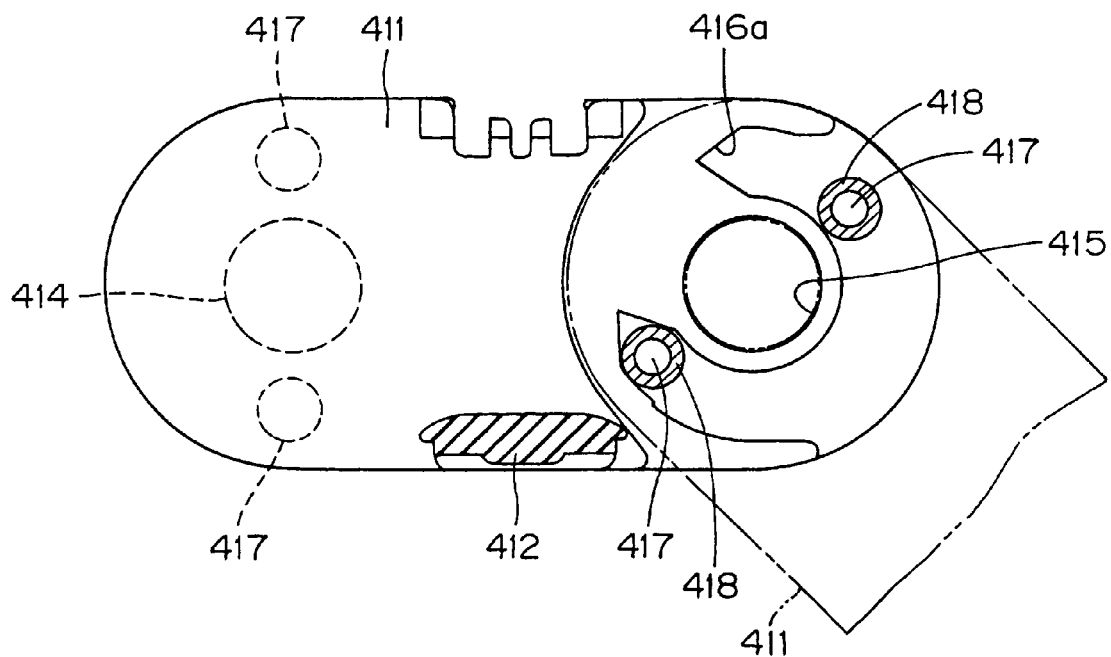
FIG. 9 is a cross-sectional view showing a flexion mode of adjacent link plates in example 4 of the present invention.

FIGS. 8 and 9 show a cable protection and guide device 400 according to example 4 of the present invention, and particularly, FIG. 8 is a cross-sectional view showing a linear mode of adjacent link plates in example 4 and FIG. 9 is a cross-sectional view showing a flexion mode of adjacent link plates in example 4.

As compared with the cable protection and guide device 300 in which the C-shaped flexion guide groove 316 and the flexion guiding protrusion 317 are formed on the above-mentioned link plates 111 and the soft roller member 318 is fitted on the flexion guiding protrusion 317, a cable or the like protection and guide device 400 according to example 4 is characterized in that it includes a braking area 416b, in which a groove width of a C-shaped flexion guide groove 416 is narrowed toward an end portion. And other device configurations of the cable or the like protection and guide device 400 according to example 4 are not different from those of the cable or the like protection and guide device 300 according to example 3.

Therefore, since the cable or the like protection and guide device 400 of example 4 includes the breaking area 416b in which the groove width of the C-shaped flexion guide groove 416 is narrowed toward an end portion, the C-shaped flexion guide groove 416 including such a narrowed groove width toward the end portion reduces the collision energy of the flexion guiding protrusion so that the flexion guiding protrusion is speed-reduced, in addition to the effect of the above-mentioned cable protection device 300. Thus, collision noise is further suppressed whereby low noise can be attained and excellent wear resistance can be exhibited. Thus the effects of the cable protection and guide device 400 are very large.

DESCRIPTION OF REFERENCE NUMERALS 100, 200, 300, 400 . . . Cable or the like protection and guide device
110 . . . Link frame body
111, 211, 311, 411 . . . . Link plate
112, 212, 312, 412 . . . Flexion inner circumferential side connecting plate
113 . . . Flexion outer circumferential side connecting plate
114, 214, 314, 414 . . . Connecting pin
115, 215, 315, 415 . . . Connecting pin hole
116, 216, 316, 416 . . . C-shaped flexion guide groove
116a, 216a, 316a, 416a . . . V-shaped stopper surface
416b . . . Breaking area
117, 217, 317, 417 . . . Flexion guiding protrusion
117a, 217a, 317a, 417a . . . Arc-shaped contact surface
318, 418 . . . Soft roller member
C . . . Cable or the like
R . . . Cable accommodating space The invention has been set forth by way of examples and those skilled in the art will readily recognize that changes and modifications may be made to the examples without departing from the spirit and the scope of the appended claims.

I claim:

1. A cable protection and guide device with a large number of rectangular link frame bodies each comprising a pair of spaced right and left link plates, wherein connecting plates are bridged over a flexion inner circumferential side and a flexion outer circumferential side of said pair of spaced right and left link plates, respectively, said link frame bodies are flexibly connected to each other by connecting pins and connecting pin holes formed in said pair of spaced right and left link plates, wherein a cable is inserted into a cable accommodating space formed of said link frame bodies to guide and protect said cable, characterized in that a C-shaped flexion guide groove concentric with said connecting pin hole is provided on a plate side surface of said pair of spaced right and left link plates, and tapered V-shaped stopper surfaces are formed on end portions of said C-shaped flexion guide groove, a flexion guiding protrusion, which engages said C-shaped flexion guide groove, is provided on a plate side surface of another link plate connected to a connecting pin hole side of said pair of spaced right and left link plates so that an arc-shaped contact surface is formed on a protrusion outer circumferential portion of the flexion guiding protrusion, and said arc-shaped contact surface of said flexion guiding protrusion makes point contact with one of the V-shaped stopper surfaces of the C-shaped flexion guide groove so that flexible movement of adjacent link plates is restricted.

2. A cable protection and guide device according to claim 1, characterized in that a plurality of the V-shaped stopper surfaces are formed, and a plurality of the guiding protrusions are formed, which respectively engage said V-shaped stopper surfaces, wherein the V-shaped stopper surfaces are formed in a state where the end portions of said C-shaped flexion guide groove are branched to the inner and outer circumferential sides.

3. A cable protection and guide device according to claim 1, characterized in that a soft roller member is fitted onto said flexion guiding protrusion.

4. A cable protection and guide device according to claim 1, characterized in that it includes a braking area in which the groove width of said C-shaped flexion guide groove is narrowed toward the end portion.

5. A cable protection and guide device according to claim 3, characterized in that it includes a braking area in which the groove width of said C-shaped flexion guide groove is narrowed toward the end portion.

* * * * *